Aug. 17, 1943.    B. A. RAETSCH    2,327,126
ARTICLE HANDLING DEVICE
Filed May 7, 1941    2 Sheets-Sheet 1
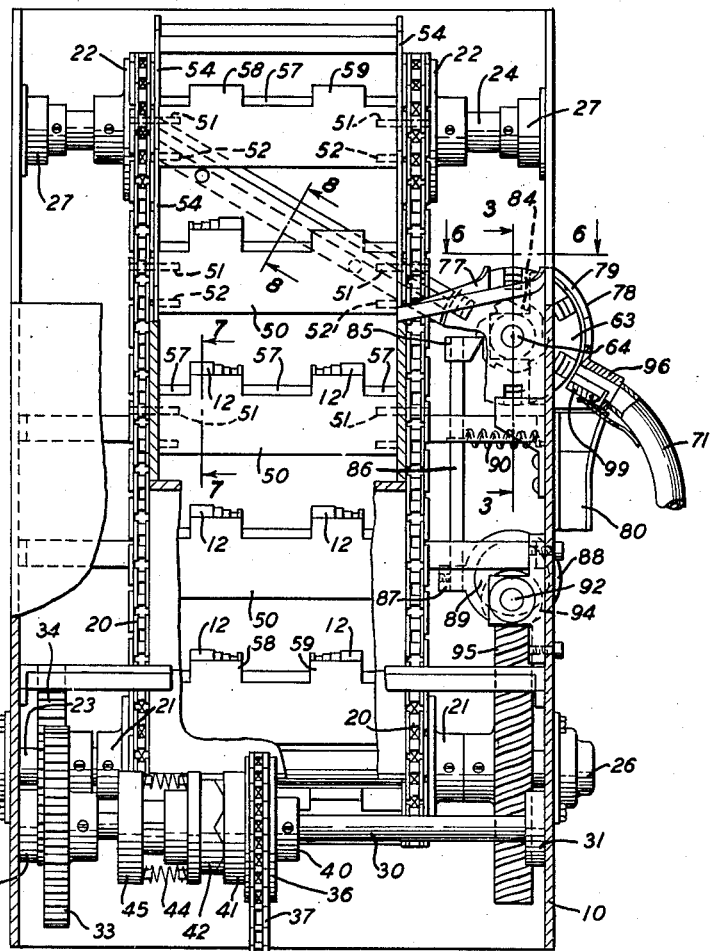
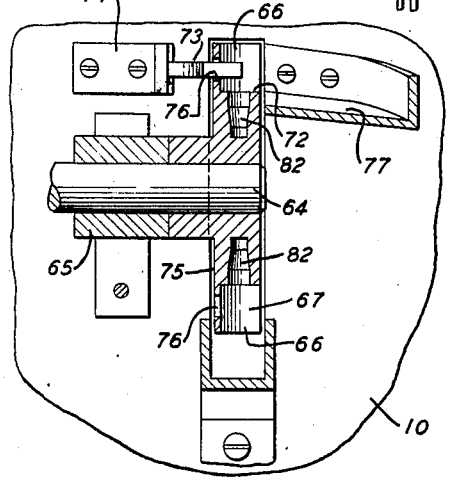
INVENTOR
B. A. RAETSCH
BY
E. B. Nowlan
ATTORNEY Aug. 17, 1943.   B. A. RAETSCH   2,327,126
ARTICLE HANDLING DEVICE
Filed May 7, 1941   2 Sheets-Sheet 2
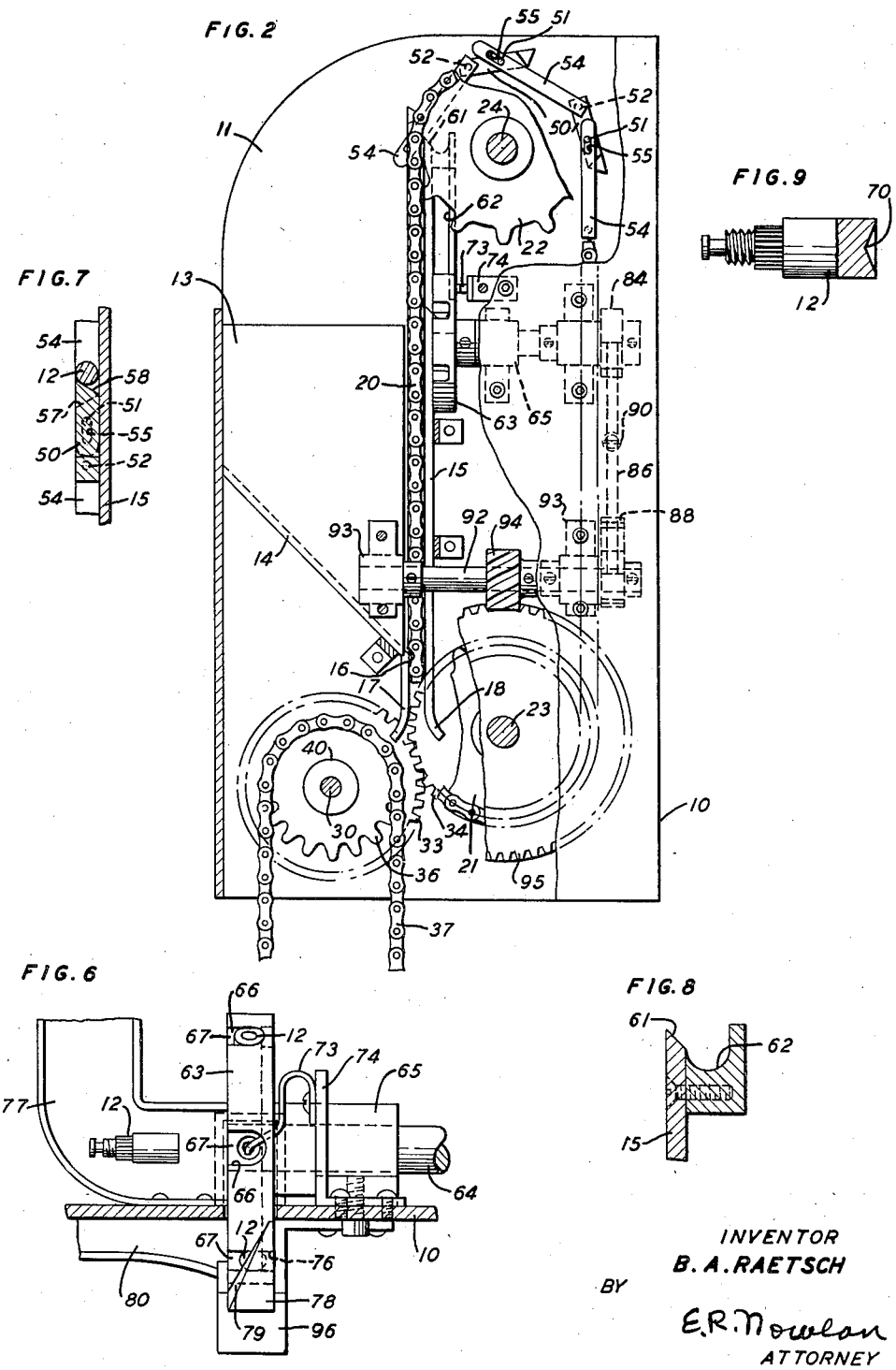
INVENTOR
B. A. RAETSCH
BY
E.R. Nowlan
ATTORNEY Patented Aug. 17, 1943

2,327,126

UNITED STATES PATENT OFFICE 2,327,126

ARTICLE HANDLING DEVICE

Bruno A. Raetsch, Baltimore, Md., assignor to Western Electric Company, Incorporated, New York, N. Y., a corporation of New York Application May 7, 1941, Serial No. 392,337

5 Claims. (Cl. 209—72)

This invention relates to article handling devices, and more particularly to devices for sorting and magazining articles.

The products of automatic screw machines are generally formed from rod stock, which stock is initially fed to a machine for the first operation, after which the machine automatically continues the subsequent feeding operations. To feed partially formed articles to such a machine, different problems arise depending upon the size and contour of the articles and the operations to be performed thereon by the machine.

An object of the invention is to provide an article handling device which is simple in structure and highly efficient in feeding and sorting articles for an article working machine.

With this and other objects in view, the invention comprises an article handling device including elements movable relative to a trough to feed articles thereto and be directed thereby to a selector wheel for rejecting articles directed one way and deliver the other articles to a magazine.

Other objects and advantages will be apparent from the following detailed description when taken in conjunction with the accompanying drawings, wherein Fig. 1 is a vertical sectional view of the device;

Fig. 2 is a side elevational view of the device, portions thereof being broken away;

Fig. 3 is an enlarged fragmentary sectional view taken along the line 3—3 of Fig. 1;

Fig. 4 is an enlarged fragmentary detailed view of the magazine and the adjacent selector wheel structure;

Fig. 5 is a fragmentary sectional view taken along the line 5—5 of Fig. 4;

Fig. 6 is a fragmentary sectional view taken along the line 6—6 of Fig. 1;

Fig. 7 is an enlarged fragmentary sectional view taken along the line 7—7 of Fig. 1, and Fig. 8 is an enlarged sectional view taken substantially along the line 8—8 of Fig. 1.

Referring now to the drawings, attention is directed to Figs. 1 and 2 which illustrate a housing 10 mounted in any suitable manner upon a suitable support (not shown). The housing 10 has an opening at the top and front portions, as at 11, for the supplying of articles 12 to a hopper 13, the latter being in the central forword portion of the housing. A lower wall 14 of the hopper extends diagonally downwardly toward an inner wall 15 but terminates short of the wall, providing a passageway 16 at the lower extremity of the hopper. An extension 17 at the lower extremity of the hopper is bent arcuately forwardly at its lower edge and cooperates with the adjacent portion of the inner wall 15 which is similarly bent arcuately in the opposite direction, as at 18, to serve as guides for endless chains 20.

The endless chains 20 are mounted upon sets of sprocket wheels 21 and 22, the lower set 21 being mounted and fixed to a shaft 23 while the upper set of sprocket wheels 21 is mounted on and fixed to a shaft 24. These shafts 23 and 24 are disposed in the housing 10 and supported by suitable bearings 26 and 27 respectively. A shaft 30, disposed parallel with the shafts 23 and 24 and supported by bearings 31 in the housing 10, has a gear 33 mounted thereupon which interengages a gear 34 mounted upon the shaft 23. Therefore, through the operative connection of the gears 33 and 34, the shaft 23 is rotated when rotation is imparted to the shaft 30. Power means (not shown, but which in the present instance may be the driving means of an automatic screw machine with which the device is to be associated) may be caused to rotate a sprocket wheel 36 through the aid of a chain 37. The sprocket wheel 36 is held against axial movement to the right (Fig. 1) on the shaft 30 by a collar 40, the latter being secured to the shaft 30. A clutch member 41 is fixed to the sprocket wheel 36 and is formed to be interengaged with a clutch member 42, the latter being movable axially of the shaft but connected for rotation therewith by suitable means such as a key or spline connection. A plurality of springs 44, positioned between the clutch member 42 and a collar 45, fixed to the shaft 30, causes normal engagement of the clutch members and permits disengagement of the clutch members should causes arise to interfere with the rotation of the shafts 23 and 24.

As will be observed by viewing Fig. 1, the endless chains 20 are disposed definite distances apart and travel constantly in definite paths, these paths being, as illustrated in Fig. 2, adjacent the inner wall 15. Positioned between the endless chains 20 is a plurality of article feeding elements 50 connected to the chains by pins 51, which at those particlular points serve as parts of the chain structures. Shorter pins 52 carried by each end of each element provide pivotal connections with links 54 which are shown more clearly in Fig. 2. The links 54 provide connections between the elements by the provision of elongate apertures 55 in the links of one element to receive the pins 51 of the next adjacent element. The purpose of the elongate apertures in the links is to allow relative movement of each link, and its associated element with the pin 51, during the travel of the links and elements about the sprocket wheels 21 and 22. The main purpose of the links is to maintain the position of the elements 50 relative to the chains during their travel and to eliminate the possibility of the elements reversing or varying their relative positions, particularly during their downward movement where they travel unaided by a wall, such as the wall 15.

Returning to the elements 50, it will be noted that the upper surface of each element is divided into five portions, the outer portions and the central portion extending diagonally in one direction as indicated at 57, while the other portions, indicated at 58 and 59, extend diagonally in another direction. With this formation of the upper surface of each element only the portions 58 and 59 will remove articles 12 from the hopper. The portions 58 and 59, however, depend upon the adjacent surface of the inner wall 15 in forming article retaining pockets or ledges in conveying the articles upwardly from the hopper.

The upper edge of the inner wall 15 extends angularly adjacent the path of the elements and is bevelled, as at 61 (Figs. 2 and 3), to direct an article carried by the elements into a trough 62 secured to the inner wall at its upper edge and extending at the same angle therewith.

Articles conveyed to the trough 62 by the elements 59 travel down the trough to a selector wheel 63, the latter being fixedly supported upon a shaft 64 which is journalled in suitable bearings, one of which is indicated at 65 (Fig. 3). The selector wheel 63 has a plurality of recesses 66 equally spaced about its periphery, these recesses being open at one side of the wheel, as indicated at 67, as well as the peripheral edge thereof. The opening of the recess at its peripheral edge is to receive all articles from the trough 62 fed thereto by the elements 50. The purpose of opening 67 at each of the recesses is to permit ejectment of all articles incorrectly directed to the selector wheel. By the term "incorrectly directed" it is meant those articles which are directed with the wrong end forward, toward the selector wheel. In the present instance let it be assumed that the end 70 is to be drilled and tapped by an automatic screw machine with which the device is associated and that in order for the article to be fed to the machine it must be directed through magazine 71 and to a transfer arm (not shown) with the end 70 leading. With this thought in mind, the article, to be fed to the magazine with the end 70 leading, must be fed to the selector with the other end leading, as the position of the article is reversed in its travel from the trough to the magazine. The selector wheel is, therefore, formed with a supporting surface 72 at the inner end of each recess 66, to support the articles singly thereon and then be fed to the trough 62 with the end 70 leading.

An ejecting spring 73, mounted upon a bracket 74 which is supported by the housing 10 (Figs. 3 and 6), is conditioned to ride upon the adjacent wall 75 of the selector wheel and project through apertures 76 at each recess 66, to force incorrectly positioned articles from the recesses, forcing them into a chute 77 which will return the articles to the hopper 13 due to its contour and position, as illustrated in Fig. 5. To further assure removal of incorrectly positioned articles in the selector wheel, an arcuately shaped ejecting member 78 conforming to the general peripheral contour of the selector wheel and has a cam-like surface 79 adapted to force any article, which projects from the recesses, out of the recesses and into a chute 80, the latter projecting downwardly to direct the articles thus ejected into any suitable receptacle (not shown).

The selector wheel is further provided with pockets 82 formed to receive the smaller end of any of the articles 12, the larger end 70 of the articles, when thus positioned in the selector, extending within the outer peripheral edge of the selector. With this construction a correctly positioned article entering a recess 66 of the selector wheel from the trough 62 will be held against ejectment by the spring 73 and will not project outwardly from the selector wheel to be engaged by the member 78, the article thus positioned being transferred by the selector wheel from the trough to the magazine 71.

The means for imparting intermittent rotary movement to the selector wheel consists of a ratchet wheel 84 (Fig. 1) fixedly mounted upon the shaft 64 and positioned to be engaged by a pawl 85. The pawl 85 is carried by one end of a rod 86, the other end of the rod being connected, as at 87, to a sleeve 88 of an eccentric 89. A spring 90 normally urges the pawl 85 into engagement with the ratchet wheel 84 and suitable means (not shown) may be provided to guide the rod 86 in its reciprocal movement caused by the eccentric 89. The eccentric 89 is mounted upon a shaft 92, the latter being journalled in bearings 93 supported by the housing 10 and having a worm 94 mounted thereon and interengaging a worm gear 95. The worm gear 95 is mounted upon the shaft 23, as illustrated in Figs. 1 and 2, and through this connection the selector wheel is rotated intermittently in synchronism with the constant movement of the elements 50.

The magazine 71 has its upper end supported by a bracket 96 which in the present instance is secured to the housing 10 and forms the member 78. The portion of the bracket 96 at the magazine 71 is of the cross sectional contour illustrated in Fig. 5, with a circular opening 98 to receive articles from the selector wheel and direct them into the magazine. It is important that the articles are fed to the magazines at a rate sufficient to supply the transfer arm of the machine with which the device is associated. If the magazine 71 should by chance become filled with articles, means is provided to prevent jamming of the selector wheel, for example by articles partially received by the magazine. This means consists of a door 99 hinged at 100 and of the contour shown in Figs. 4 and 5, to, when completely closed, complete the circular contour of the opening 98, the door being normally held closed by a spring 101. Therefore, during normal conditions, with the magazine only partially filled or less than completely filled, the door 99 will remain closed, but if the magazine should be filled so that the next presented article will not be completely received thereby, rotation of the selector wheel 63 with the partially ejected article will cause the door to be opened a sufficient distance to drop the article into the chute 80.

During the operation of the apparatus the shaft 30 is rotated from power means (not shown) through the chains 20 and the sprocket wheel 36, this motion being transmitted to the shaft through the clutch members 41 and 42. Rotation of the shaft 30 will cause rotation of the shafts 23 and 24, imparting movement to the elements 50 through their sprocket wheels 21 and 22 and the chains 20. Simultaneous with the movement of the elements 50, the selector wheel 63 is caused to operate through the worm gear 95, the worm 94, the shaft 92, the eccentric 83, the rod 86, the pawl 85, the ratchet wheel 84 and the shaft 64. The formation of the elements 50 in moving through the passageway 16 of the hopper 13, will pick up an article on each of the surfaces or portions 58 and 59, articles engaging the portions 57 remaining in the hopper. The articles being transported by the portions 58 and 59 of the elements may be disposed in either of two positions, either the correct position or the incorrect position. Regardless of the position in which the article is disposed, it will be moved upwardly, lying on the diagonal surfaces 58 or 59, which surface cooperates with the adjacent surface of the wall 15 to provide a pocket for the article. The accurate spacing of the portions 58 and 59 on each element as well as the accurate spacing of the elements one from another and the angular positioning of the trough relative to the elements, results in the deposit of articles into the trough at definite spaced intervals of time. For example, the element 50 shown in Fig. 1 which has just reached the trough has its portion 59 located at a position to deposit its article in the trough. At this time the selector wheel 63 has just been moved to locate a recess 66 at the lower end of the trough to receive the deposited article. The movement of the elements is continuous, yet during the lapse of time between the depositing of the article, from the aforementioned portion 59 of the element adjacent the trough, and the movement of the article on the portion 58 of this element to a position where it will be dropped into the trough, the selector wheel will have received its article from the portion 59 and rotated to the next position, locating the next recess 66 adjacent the lower end of the trough. Attention is directed to the fact that the articles from the portions 58 have farther to travel than those from the portions 59. To compensate for this, so that all articles will reach the selector at like intervals of time, there is a greater time interval between the feeding of an article from a portion 58 of one element and the feeding of an article from a portion 59 of the next element, than there is between the feeding of an article from a portion 59 of one element and an article from the portion 58 of the same element. It will, therefore, be observed that although each article is dropped into the trough at different but alternately like spaced intervals of time, the articles will all reach the selector at like intervals of time and vacant recesses 66 of the selector wheel will be singly positioned at the lower end of the trough to receive them.

When the article on the portion 58 of the element 50 adjacent the trough is dropped into the trough, it will ride down the trough and enter the recess 66 positioned there to receive it. This article, however, is incorrectly positioned and will rest upon the supporting surface 72 (Fig. 3). The article thus positioned in the recess will, when the selector wheel receives its next rotary movement, be advanced to the position where the spring 73 will be allowed to enter the aperture 76, thereadjacent, rapidly and strike the article, to move it into the chute 77 and cause it to pass back into the hopper 13. If by chance this ejecting means does not completely remove the article the surface 79 of the member 78 will force the article out of the opening 67 of its recesses 66 and free of the selector wheel, causing it to drop into the chute 80. The same operation will take effect regarding the next article presented to the chute, this being the article on portion 59 of the next element approaching the trough. However, when the article on the portion 58 of this next element is dropped into the chute the smaller end of the article, when entering the recess 66 of the selector wheel, will continue in its movement until it enters a pocket 82. This article will not be disturbed by the ejecting spring 73, as it is held against displacement in the pocket, and will, therefore, pass free of the member 78 so that, upon arriving at a position diametrically opposite the trough, the article will, by gravity, enter the magazine 71.

It will, therefore, be apparent that the device requires no attention other than maintaining the hopper supplied with articles. The device operates from a power means which may include that of the machine with which it is associated. No means is provided to deliver the articles to the trough in the correct positions, as such a problem would require a complicated mechanism for its solution. Such a mechanism is not necessary in view of the fact that the elements deliver the articles to the trough at a greater rate than necessary to supply the magazine and the selector wheel with its associated ejecting means eliminate the possibility of any article entering the magazine incorrectly positioned.

The embodiment of the invention herein disclosed is merely illustrative and may be modified and widely departed from in many ways without departing from the spirit and scope of the invention as pointed out in and limited solely by the appended claims.

What is claimed is:

1. An article handling device comprising a trough, a magazine, a selector to receive articles from the trough and transfer them to the magazine, and a door actuable, when the magazine is full, by an article being transferred by the selector to eliminate jamming of the selector.

2. An article handling device which comprises a hopper for articles, a plurality of elements spaced from one another and movable in a path through the hopper, a plurality of spaced article engaging portions on each element, a wall adjacent to the path of the elements, said wall cooperating with the spaced article engaging portions in the removal of articles from the hopper, a trough disposed at an angle relative to the path of the elements and having one edge coterminous with the upper edge of the wall, and a selector positioned at one end of the trough to receive articles, said elements, spaced article engaging portions, and trough, being so related spacially as to cause the articles to be deposited singly in the trough at unequal periods of time and to arrive at the selector at similarly spaced intervals of time.

3. An article handling device comprising a hopper for retaining articles, a trough, a selector positioned at one end of the trough, means for conveying articles from the hopper and depositing them in the trough, said means being so positioned in relation to the trough that the articles are successively deposited in the trough at unequal intervals of time and reach the selector at substantially equal intervals of time, a magazine for receiving the articles from the selector, spring actuated means and cam actuated means interposed between the magazine and the selector to eject from the selector incorrectly positioned articles, and a door actuable, when the magazine is full, by an article being transferred by the selector to prevent jamming of the selector.

4. An article handling device comprising a plurality of elements movable in a path, a wall adjacent to the path, a plurality of members on the movable elements formed so as to cooperate with the wall to cause the articles to move along the path, a selector, and an inclined trough for feeding articles to the selector and having one edge thereof coterminous with the upper edge of the wall, the angle of the trough and the spacing of the members on the elements being so related as to cause the articles to be deposited singly into the trough at unequal intervals of time in order that they may arrive at the selector at equal intervals of time.

5. An article handling device which comprises a hopper for retaining articles, a magazine, a selector for transferring articles to the magazine, means for conveying articles from the hopper to the selector, spring means for forcefully striking all of the articles transferred by the selector to remove all incorrectly positioned articles therefrom, cam means for ejecting incorrectly positioned articles from the selector which the spring means have improperly failed to eject, and a door formed in the magazine which when the magazine is full is actuable by an article being transferred by the selector to prevent jamming of the selector.

BRUNO A. RAETSCH.